Patented Nov. 25, 1952

2,619,482

UNITED STATES PATENT OFFICE 2,619,482

SULFURIZED CONDENSATION PRODUCTS

Leonard E. Beare, Lansing, Ill., Milton P. Kleinholz, East Chicago, Ind., and William S. Hoock, St. Louis, Mo., assignors to Sinclair Refining Company, New York, N. Y., a corporation of Maine No Drawing. Application March 3, 1949,
Serial No. 79,513

7 Claims. (Cl. 260—137)

This invention relates to the production of new compositions of matter resulting from the reaction of a bicyclic terpene, sulfur, and a phosphorus sulfide with an alkylated phenol or an alcohol.

We have discovered that compositions of matter resulting from the reaction of a bicyclic terpene, sulfur, and a phosphorus sulfide with an alkylated phenol or an alcohol possess considerable value as addends for lubricants. These compositions are generally useful as oxidation and bearing-corrosion inhibitors in lubricating oils and are of particular merit in "multi-purpose" gear lubricants subject to varying conditions of speed and torque.

The characteristics of the compositions of our present invention vary somewhat, depending upon the nature and proportions of the various reactants used. However, the compounds are generally relatively acidic and are highly soluble in mineral oils. In the formation of these compounds, the condensation reaction product of the phosphorus sulfide and bicyclic terpene is sulfurized and then reacted with an alkylated phenol or an alcohol. However, the bicyclic terpene alone may be sulfurized, then reacted with phosphorus sulfide, and finally with the phenol or alcohol.

A bicyclic terpene, for example, alpha-pinene, is initially contacted with a phosphorus sulfide, preferably phosphorus pentasulfide. The reaction thus effected proceeds spontaneously upon a slight heating, since it is of an exothermic nature. A desirable method of instituting this reaction is to heat the alpha-pinene in a vessel to about 275° F., or slightly higher, and then, without further heating, slowly add the phosphorus pentasulfide while maintaining a vigorous agitation. The heat of the reaction is considerable, and consequently, the addition should be made slowly so as to avoid the possibility of the reaction becoming uncontrollable.

After the addition is completed, it is usually necessary to apply heat externally to complete the reaction, the temperature during this latter stage preferably being maintained at about 275° F., although a thermal environment in the range of about 200 to 400° F. may be employed.

This mixture is then raised in temperature to about 325° F., whereupon sulfur is added slowly. The reaction mass is further reacted at about 325° F. for a period of time, whereupon it is cooled to about 275° F. and an alkylated phenol or an alcohol added. The mixture is finally, and most advantageously, heated for an additional length of time at about the same temperature. Since the compositions thereby formed are of a highly viscous nature, even at elevated temperatures, it is usually necessary, for ease of handling, to add a solvent-treated Mid-Continent neutral oil or other light petroleum fraction.

As an alternative procedure in preparing these compositions, the alpha-pinene may be initially sulfurized, e. g., the sulfur is added to alpha-pinene at a temperature of about 300° F. Upon completion of the addition, the reactants are heated at the same temperature for a period of time in order that the reaction is completed. The mixture is then cooled to about 275° F., whereupon the phosphorus pentasulfide is added slowly while a vigorous agitation is maintained. Here again the exothermic nature of the process dictates a slow addition so as to avoid the possibility of the reaction becoming uncontrollable. In order to complete this reaction, the mixture is preferably further heated, whereupon an alkylated phenol or an alcohol is then added and the resulting mixture again heated for a length of time. A light oil, as described hereinbefore, is then advantageously admixed with the compound so as to promote ease of handling.

The molar relation of alpha-pinene to phosphorus pentasulfide may vary; however, a molar ratio of alpha-pinene to phosphorus pentasulfide, resulting in highly desirable compounds, is within the range of about 3:1 to about 5:1. Pure alpha-pinene is preferred in preparing these compositions; however, a reactant comprising substantially alpha-pinene in admixture with other related terpenes, such as camphenes and dipentenes, is satisfactory.

The proportions of the sulfur employed may be varied over a wide range, depending upon the properties of the finished composition desired. Based upon the amount of phosphorus pentasulfide utilized, the addition of the sulfur is preferably in the range of about 0.5:1 to about 5:1.

The optimum proportion of the alkylated phenol or alcohol used is, to a considerable extent, dependent upon the ratio of alpha-pinene to phosphorus pentasulfide. Generally satisfactory results have been obtained by employing a ratio of an alkylated phenol to phosphorus pentasulfide of about 0.25:1 to about 2:1. The alkylated phenols employed are most advantageously para-tertiary amyl phenol and para-cyclohexyl phenol. However, other alkylated phenols containing from three to fifteen carbon atoms in the alkyl groups may be utilized. Exemplary are isopropyl phenol, tertiary-butyl phenol, di-secondary amyl phenol, di-tertiary amyl phenol, di-isobutyl phenol, triisobutyl phenol and the like. In addition, alcohols, such as 2-ethylbutyl alcohol, octanol-1, 2-ethylhexyl alcohol, capryl alcohol and the mixture of decyl, dodecyl, and tetradecyl alcohols derived from coconut oil may also be used to replace part or all of the alkylated phenol. However the alkylated phenols are preferred.

We do not know the exact mechanism of the reactions forming these compositions, nor have we been able, because of their complexity, to assign a molecular weight or structure to them.

The following are specific examples of the compositions and illustrate the procedure by which they may be successfully prepared.

Example A 2176 gms. (16 moles) of alpha-pinene were charged into a five-liter, three-necked flask equipped with a mechanical stirrer and thermometer. The alpha-pinene was heated to 275° F. with an electric heating mantle, whereupon the heat was turned off. 888 gms. (4 moles) of phosphorus pentasulfide were added portionwise, over a 2½ hour period, accompanied with vigorous stirring, the heat of the reaction maintaining the temperature in the range of 275° F. to 290° F. The reaction mixture was heated for an additional two hours at 275° F. Then the temperature was raised to 325° F. and 192 gms. (6 atoms) of sulfur were added in three equal portions. After the final addition of sulfur, the temperature rose to 361° F. because of the exothermic nature of the reaction. The mixture was cooled to 325° F. and held at 325 to 335° F. for six hours. 1628 gms. of the reaction mixture, one half of the total, were removed from the flask, and to the balance were added 246 gms. (1.5 moles) of para-tertiary amyl phenol. The reaction mass was heated for ten hours at 275° F., following which, an oil concentrate was prepared by dissolving the compound formed in 2058 gms. of a solvent-treated Mid-Continent neutral oil, and the solution filtered with filter aid. An analysis of the oil concentrate thus prepared indicated that it contained 2.72% phosphorus and 10.56% sulfur and had an acid number of 6.5 and a saponification number of 68.0.

Example B 1088 gms. (8 moles) of alpha-pinene were charged into a five-liter, three-necked flask and heated to 275° F. The heat was turned off and 444 gms. (2 moles) of phosphorus pentasulfide were added over a one-hour period accompanied with vigorous stirring, the heat of reaction maintaining the temperature at 275 to 290° F. The reaction mass was heated an additional two hours at 275° F. and then raised to 325° F. 96 gms. (3 atoms) of flowers of sulfur were added and the reaction mixture heated for six hours at 325 to 335° F. After cooling to 275° F., 246 gms. (1.5 moles) of para-tertiary amyl phenol were added and the reaction mass heated for ten hours at 275 to 280° F. 2058 gms. of the neutral oil were added to the product formed and mixing was continued for one-half hour. 80 gms. of a filter aid were further added and the product was filtered. An analysis of the oil concentrate thus prepared indicated that it contained 3.10% phosphorus, 10.84% sulfur and had an acid number of 5.4 and a saponification number of 71.4.

Example C

To 544 gms. (4 moles) of alpha-pinene, heated to 275° F., were added 222 gms. (1 mole) of phosphorus pentasulfide in small portions so that the heat of reaction maintained the reaction at 275° F. After all the phosphorus pentasulfide had been added, the reaction mass was heated at 275° F. for seven hours and then raised to 325° F. 64 gms. (2 atoms) of sulfur were added and the mixture then maintained at 325° F. for six hours. After cooling to 275° F., 123 gms. (0.75 mole) of para-tertiary amyl phenol were added. The reaction mass was then heated for ten hours at 275° F. 1029 gms. of the neutral oil were added to prepare an oil concentrate. An analysis of the oil concentrate thus prepared indicated that it contained 3.00% phosphorus and 10.73% sulfur and had an acid number of 5.8.

Example D

The composition prepared in this example was formed by the procedure described in Example B, except that the temperature range maintained during the reaction with sulfur was 320°±5° F. and the reaction time after the addition of the para-tertiary amyl phenol was nine hours. An analysis of the oil concentrate thus prepared indicated that it contained 3.08% phosphorus and 10.68% sulfur and had an acid number of 7.2 and a saponification number of 65.0.

Example E

The composition prepared in this example was formed by the procedure described in Example D, except that the reaction time after the addition of the para-tertiary amyl phenol was five hours. An analysis of the oil concentrate thus prepared indicated that it contained 2.98% phosphorus and 10.60% sulfur and had an acid number of 7.5 and a saponification number of 65.6.

Example F

The composition prepared in this example was formed by the procedure described in Example D, except that the reaction time after the addition of the para-tertiary amyl phenol was fifteen hours. An analysis of the oil concentrate thus prepared indicated that it contained 2.94% phosphorus and 10.46% sulfur and had an acid number of 6.7 and a saponification number of 71.7.

Example G 4352 gms. (32 moles) of alpha-pinene were charged into a twenty-two-liter, three-necked flask equipped with a thermometer, motor driven stirrer, and electric heating mantle and heated to 275° F. The heat was turned off and 1776 gms. (8 moles) of phosphorus pentasulfide added slowly, over a two-hour period accompanied with vigorous stirring, the temperature being maintained at 275 to 290° F. because of the exothermic nature of the reaction. After all the phosphorus pentasulfide had been added, the reaction mass was heated at 275° F. for one hour longer, and then raised to 320° F. 384 gms. (12 atoms) of sulfur were then added, and the temperature held at 315 to 320° F. for six hours. During the next hour, the temperature was lowered to 275° F. and 1056 gms. (6 moles) of para-cyclohexyl phenol were added. The reaction was continued at 275 to 280° F. for ten hours and then at 305 to 320° F. for five hours. 8160 gms. of the neutral oil were then added and the product filtered. An analysis of the oil concentrate thus prepared indicated that it contained 3.11% phosphorus and 10.58% sulfur and had an acid number of 5.3 and a saponification number of 65.6.

Example H 1360 gms. (10 moles) of alpha-pinene were heated to 300° F. in a five-liter, three-necked flask equipped with a mechanical stirrer and a thermometer. 192 gms. (6 atoms) of sulfur were added, and the reactants heated for three hours at 300° F. The reaction mass was cooled to 275° F., and with the heat turned off, 444 gms. (2 moles) of phosphorus pentasulfide were added portionwise over a 1¼ hour period, the heat of reaction maintaining the temperature at 275° F. Heating at 275° F. continued for two hours, and at 300° F. for three additional hours.

To one fourth of the intermediate reaction product were added 88 gms. (0.5 mole) of para-cyclohexyl phenol, and the reaction mass was then heated for 9½ hours at 300° F. 483 gms. of the neutral oil were then added and the product filtered, using a small amount of a filter aid. An analysis of the oil concentrate thus prepared indicated that it contained 2.96% phosphorus and 11.64% sulfur and had an acid number of 6.5 and a saponification number of 64.2.

Example I

To the remaining three-fourths of the intermediate prepared in Example H by the reaction of sulfurized alpha-pinene with phosphorus pentasulfide, heated to 280° F., were added 246 gms. (1.5 moles) of para-tertiary amyl phenol. The reaction period was 9½ hours at 300° F. 1196 gms. of the neutral oil were added thereto, as was a filter aid, and the oil concentrate so formed was then filtered. An analysis of the oil concentrate thus prepared indicated that it contained 3.08% phosphorus and 12.97% sulfur and had an acid number of 8.2 and a saponification number of 71.9.

Example J 288 gms. (9 atoms) of sulfur and 1360 gms. (10 moles) of alpha-pinene were heated for three hours at 300 to 305° F. in a five-liter, three-necked flask provided with a mechanical stirrer and a thermometer. The reaction mass was cooled to 275° F., and with the heat turned off, 444 gms. (2 moles) of phosphorus pentasulfide were added portionwise over a two-hour period, the heat of reaction maintaining the temperature at 275 to 285° F. The reaction continued for one hour at 275° F. and for three hours at 300° F. 410 gms. (2.5 moles) of para-tertiary amyl phenol were added and reacted for ten hours at 300° F. 1418 gms. of the neutral oil were then introduced so as to form an oil concentrate which was then filtered. An analysis of the oil concentrate thus prepared indicated that it contained 3.42% phosphorus and 15.66% sulfur and had an acid number of 14.5 and a saponification number of 80.2.

Although the preparations of most of the illustrative examples appear to be quite similar because of closely related chemical properties, there are certain differences to be noted. The dissimilarities result essentially from the quantities and nature of the reactants employed, the reaction periods, and the reaction order.

Several of the seven exemplary products prepared by the reaction of alpha-pinene and phosphorus pentasulfide, followed by sulfurization and then reaction with the phenol, were blended with certain other compositions and tested. The blends consisted of 6% of a commercially available chlorinated naphthalene of 57% chlorine content, 86% of a solvent-treated Mid-Continent oil having a S. U. S. viscosity of 90 seconds at 210° F. and 8% in each instance of the compounds of Examples D, E, and F, respectively. The compositions were then evaluated for the ferrous metal protection that they afforded in the presence of water. 200 gms. of each blend were admixed with 5 cc. of distilled water and stirred at 180° F. for four hours with a S. A. E. 1020 cold-rolled steel paddle revolving at 550 R. P. M. In all three instances no rust resulted. However, the depositions produced on the steel paddle varied considerably in appearance. The test blend in which was incorporated Example E coated the paddle with a black-brown layer containing superimposed gray spots, while the deposition of Example D was brown and that of Example F light gray in color.

The three reaction products tested in this blend were constituted of identical proportions of the reactants. However, the reaction time after the phenol addition varied between five and fifteen hours.

The last three preparations, H, I, and J, were prepared by the alternate procedure of reacting the condensation product of sulfurized alpha-pinene and phosphorus pentasulfide with an alkylated phenol. The examples indicate that this order of reaction is productive of certain differences in compositions so produced. However, both reaction orders result in compositions generally effective as gear oil additives, although we have been unable to definitely characterize the products of the two reaction procedures.

We claim:

1. A composition of matter prepared by the reaction of about 3 to 5 moles of a bicyclic terpene, about 0.5 to 5 atoms of sulfur, about 1 mole of a phosphorus sulfide, and about 0.25 to 2 moles of a compound selected from the class consisting of alkylated phenols and alcohols.

2. A composition of matter prepared by the reaction of about 3 to 5 moles of alpha-pinene, about 0.5 to 5 atoms of sulfur, about 1 mole of phosphorus pentasulfide, and about 0.25 to 2 moles of a compound selected from the class consisting of alkylated phenols and alcohols.

3. A composition of matter prepared by the reaction of a sulfurized condensation product of alpha-pinene and phosphorus pentasulfide with a compound selected from the class consisting of alkylated phenols and alcohols, wherein about 0.5 to 5 atoms of sulfur, about 3 to 5 moles of alpha-pinene, about 1 mole of phosphorus pentasulfide, and about 0.25 to 2 moles of a compound selected from the class consisting of alkylated phenols and alcohols are reacted.

4. A composition of matter prepared by the reaction of a condensation product of sulfurized alpha-pinene and phosphorus pentasulfide with a compound selected from the class consisting of alkylated phenols and alcohols, wherein about 0.5 to 5 atoms of sulfur, about 3 to 5 moles of alpha-pinene, about 1 mole of phosphorus pentasulfide, and about 0.25 to 2 moles of a compound selected from the class consisting of alkylated phenols and alcohols are reacted.

5. A composition of matter prepared by the reaction of about 3 to 5 moles of alpha-pinene, about 0.5 to 5 atoms of sulfur, about 1 mole of phosphorus pentasulfide, and about 0.25 to 2 moles of an alkylated phenol.

6. A composition of matter prepared by the reaction of a sulfurized condensation product of alpha-pinene and phosphorus pentasulfide with an alkylated phenol, wherein about 0.5 to 5 atoms of sulfur, about 3 to 5 moles of alpha-pinene, about 1 mole of phosphorus pentasulfide and about 0.25 to 2 moles of alkylated phenol are reacted.

7. A composition of matter prepared by the reaction of a condensation product of sulfurized alpha-pinene and phosphorus pentasulfide with an alkylated phenol, wherein about 0.5 to 5 atoms of sulfur, about 3 to 5 moles of alpha-pinene, about 1 mole of phosphorus pentasulfide, and about 0.25 to 2 moles of alkylated phenol are reacted.

LEONARD E. BEARE.
MILTON P. KLEINHOLZ.
WILLIAM S. HOOCK.

REFERENCES CITED

The following references are of record in the file of this patent:

UNITED STATES PATENTS

| Number | Name | Date |
| --- | --- | --- |
| 2,379,312 | May | June 26, 1945 |